United States Patent [19]

Schäfer et al.

[11] Patent Number: 4,641,312

[45] Date of Patent: Feb. 3, 1987

[54] METHOD AND DEVICE FOR PRODUCING INDIVIDUAL SHORT LASER PULSES

[75] Inventors: Fritz P. Schäfer, Göttingen-Nikolausberg; Sandor Szatmari, Göttingen; Zsolt Bor, Göttingen-Nikolausberg, all of Fed. Rep. of Germany

[73] Assignee: Max-Planck-Gesellschaft zur Foerderung der Wissenschaften e.V., Fed. Rep. of Germany

[21] Appl. No.: 607,320

[22] Filed: May 4, 1984

[30] Foreign Application Priority Data

May 10, 1983 [DE] Fed. Rep. of Germany ....... 3317065
Sep. 16, 1983 [DE] Fed. Rep. of Germany ....... 3333575

[51] Int. Cl.⁴ .............................................. H01S 3/10
[52] U.S. Cl. .......................................... 372/25; 372/97; 372/96; 372/93; 372/54; 372/69
[58] Field of Search ..................... 372/25, 97, 96, 23, 372/93, 94, 54, 69

[56] References Cited

U.S. PATENT DOCUMENTS

| | | | |
|---|---|---|---|
| 3,675,157 | 7/1972 | Kaminow et al. | 372/96 |
| 3,786,368 | 1/1974 | Bjorkholm et al. | 372/96 |
| 3,969,684 | 7/1976 | de Witte et al. | 372/25 |
| 4,268,801 | 4/1981 | Stappaerts | 372/97 |
| 4,479,220 | 10/1984 | Bor et al. | 372/25 |

OTHER PUBLICATIONS

Shank et al., "Tunable Distributed-Feedback Laser", Appl. Opt. Lett., vol. 18, No. 9, 1 May 1971.

Primary Examiner—Leon Scott, Jr.
Attorney, Agent, or Firm—Kinzer, Plyer, Dorn & McEachran

[57] ABSTRACT

A method of producing individual short laser pulses in which a stimulatable laser medium is excited by a pump pulse in order to produce a population inversion above a laser threshold value, the population inversion being kept below the threshold value after emission of the short radiation pulse. The laser medium is common to two resonators and from it energy in the form of the desired individual short laser radiation pulse is first taken from the first resonator by means of a first relaxation process of given threshold value, relatively short time constant and relatively low quality factor, after which the inversion in the laser medium is kept below the preset threshold value of the first resonance process by a second relaxation process of relatively long time constant and relatively high quality factor in the second resonator coupled to the first. The resulting individual short laser radiation pulse can be supplied as pump pulse to a distributed feedback dye (DFB) laser at an intensity relative to the DFB laser medium threshold such that the DFB laser emits at least one ultra-short radiation pulse.

19 Claims, 11 Drawing Figures

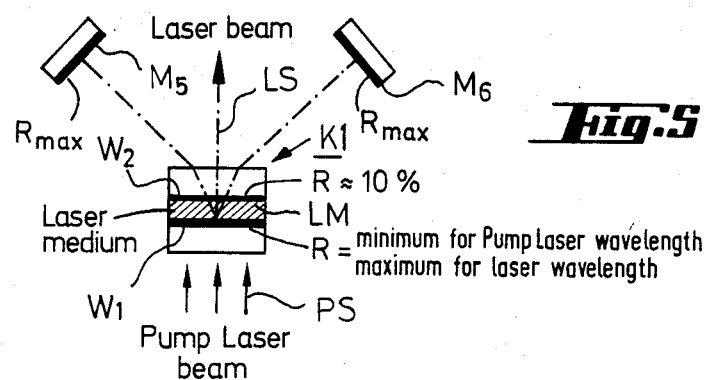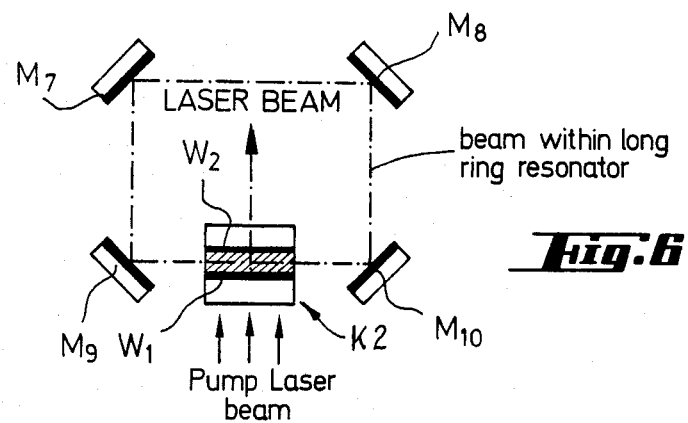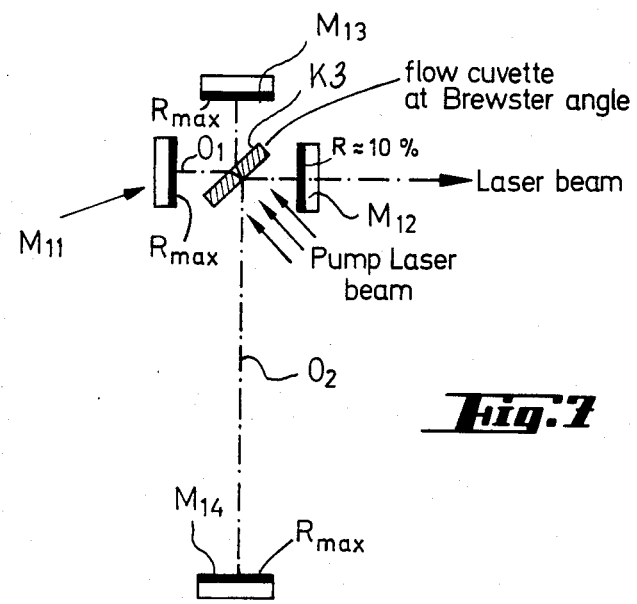

Fig. 8

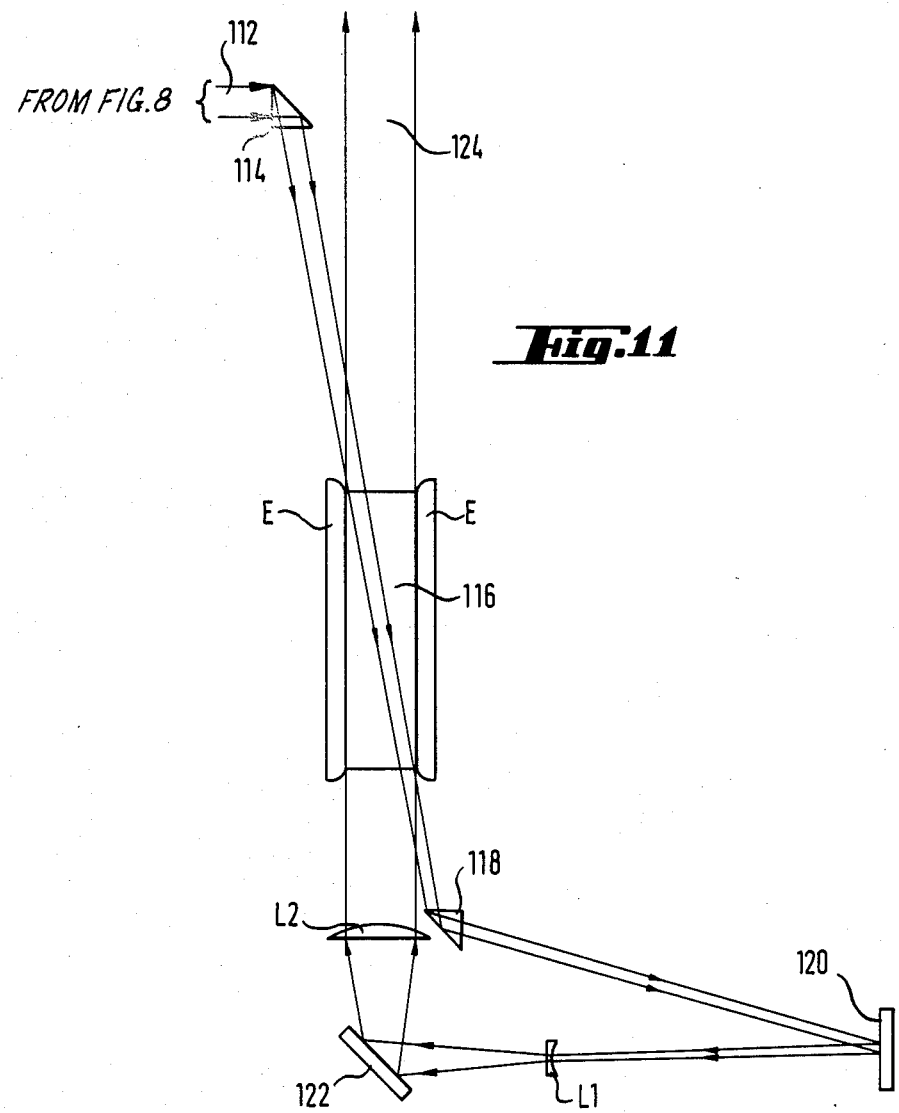

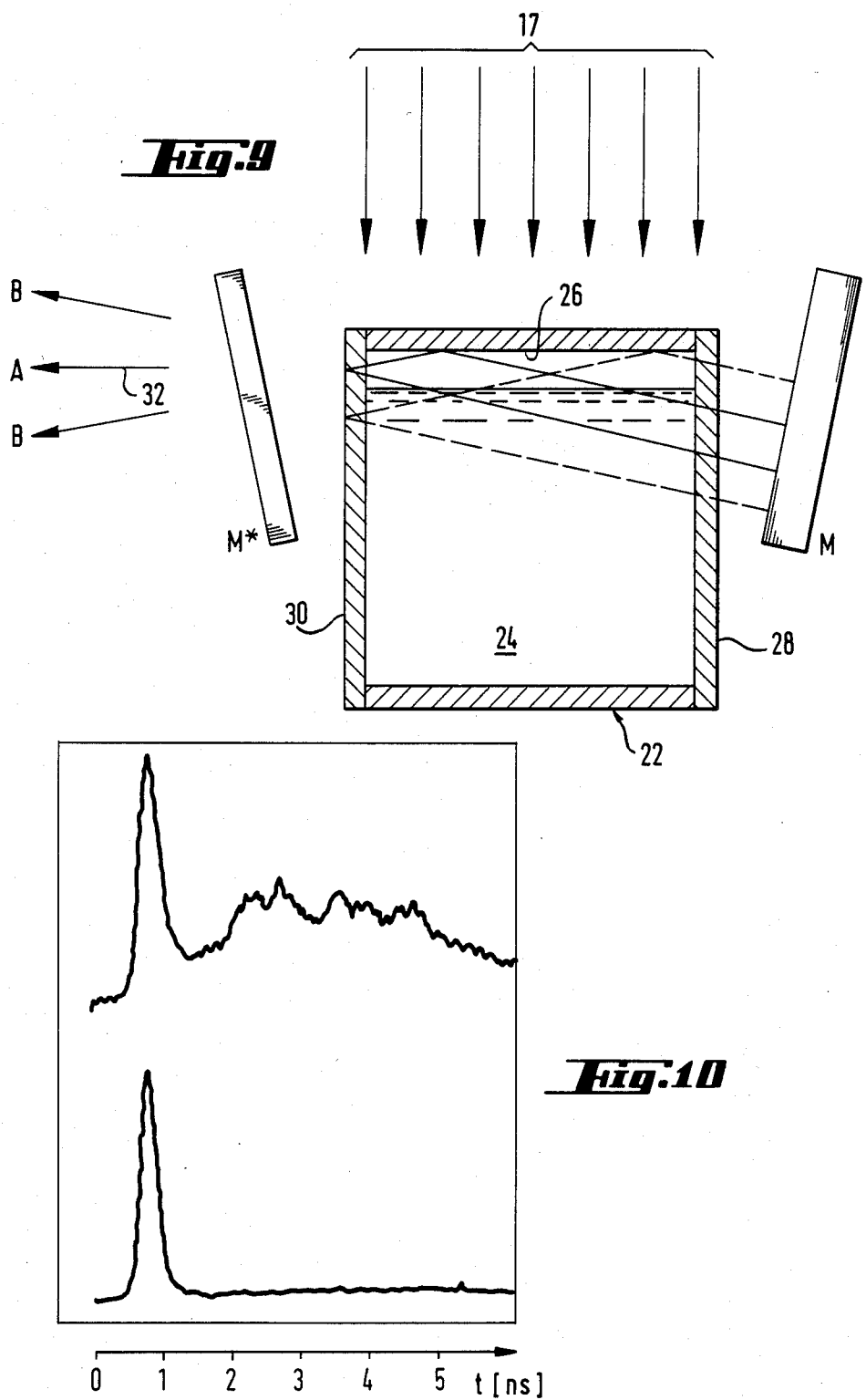

METHOD AND DEVICE FOR PRODUCING INDIVIDUAL SHORT LASER PULSES

There are some known methods of producing short laser pulses which, in addition to the active laser medium and laser resonator, require technical devices such as Kerr cells, Pockels cells, cells with dye solutions, acoustic-optical deflectors, or rotating prisms or mirrors and are therefore very expensive. Other methods, e.g. synchronous pumping, for producing ultrashort pulses in the pico-second range, do not require a complex laser which emits the short pulses; however, they require a pump laser of considerable complexity because it has to produce short pump pulses of high energy, even though their full width at half maximum (FWHM) is only a few hundred pico-seconds.

D. Roess: Giant Pulse Shortening by Resonator Transients; J. Appl. Phys. Vol. 37 pp. 2004–2006 (1966) discloses a method of producing short laser pulses in which a laser is transiently pumped by a second, pulsed laser so as to generate relaxation oscillations having an amplitude waveform which can be calculated from the waveform of the pump pulse, the optical and geometrical data of the active medium and the resonator data, using "rate equations". These equations are two coupled non-linear differential equations, the first describing the variation in time of the inversion of the active medium and the second describing the variation in time of the photon density in the resonator (which is proportional to the output power).

A typical solution of these equations for an arbitrary example and a given pump pulse amplitude is shown in FIG. 1. From top to bottom, FIG. 1 shows the time variation of the pump pulse amplitude (curve A), of the inversion in the active medium (curve B) and of the photon density in the resonator (curve C), respectively. It can be seen that, owing to the considerable non-linearity of the process, the photon density takes the form of a number of separate relaxation pulses of decreasing amplitude. If the pump light amplitude is reduced, there is also a reduction in the amplitude of the generated relaxation pulses until only the first is left, whereas the subsequent pulses disappear since the required inversion threshold value is not subsequently reached by the pump pulse.

In order to obtain such an individual pulse with a very short duration (FWHM), the resonator life time must be short compared with the pump pulse. In addition, the pump pulse amplitude must not be too high, or there will be a risk of a second relaxation oscillation pulse occurring. The optimum choice for the various parameters for obtaining a very short individual pulse at a given pulse duration (FWHM) is disclosed by J. Q. Yao: Optimum Operational Parameters of the Ultrashort Cavity Laser—Appl. Phys. Lett. Vol. 41(2) pp. 41, 136–138 (1982). In general, this method can yield pulses up to ten times as short as the pump pulse. Particular care must be taken that the pump pulse amplitude does not rise above the threshold value for producing the second relaxation pulse. See also Chinlon Lin "Studies of Relaxation Oscillations in Organic Dye Lasers, IEEE Journ. Quant Electronics Vol. QE II, No. 8, August 1975, pp. 602–609.

Another method of shortening a laser pulse is to send a second laser beam in a different direction through the active laser medium during a laser radiation pulse, the intensity of the second beam being considerably stronger so as rapidly to reduce the inversion of the active medium, so that the original laser emission can no longer be maintained and the original laser pulse terminates. A second laser beam suppressing the first can be produced in various ways, e.g. by providing a second resonator sharing an active medium with the first resonator. If the second resonator has a higher Q than the first, the number of photons in the second resonator will usually, at a certain time, exceed the number of photons in the first resonator and thus be able to reduce the inversion in the common active medium more quickly than the laser beam generated in the first resonator. This and other methods of generating laser radiation pulses down to a duration (FWHM) somewhat below one nanosecond are described in the following publications:

A. Andreoni, P. Benetti, and C. A. Sacchi; Subnanosecond Pulses From A Single-Cavity Dye Laser—Appl. Phys. Vol. 7, pp. 61–64 (1975);

A. Eranian, P. Dezauzier, and O. De Witte: 2-nsec Pulses from Double Cavity Dye Laser.—Optics Communications Vol. 7, No. 2, pp. 150–154 (1973);

H. Inomata and A. I. Carswell: Simultaneous Tunable Two-Wavelength Ultraviolet Dye Laser.—Optics Communications Vol. 22, No. 3, pp. 278–282 (1977);

H. Lotem and R. T. Lynch, Jr.: Double-Wavelength Laser.—Appl. Phys. Lett. Vol. 27, No. 6 pp. 344–346 (1975).

U.S. application Ser. No. 79,373 filed Sept. 27, 1979, now U.S. Pat. No. 4,479,220, and the corresponding U.K. Pat. No. 2,039,411 disclose a method of producing ultra-short laser pulses in which a DFB (=distributed feedback) laser containing an active laser medium, more particularly a dye, is stimulated by a pump or excitation radiation pulse having a duration (FWHM) less than 20 ns and an intensity exceeding the stimulatable laser medium threshold by not more than 20%.

The term "ultrashort" laser radiation pulses is used in the literature usually for pulses having a FWHM below about 100 pico-seconds, and this definition will be used here. Such pulses are being increasingly required for a number of applications, including the ultra-violet spectral region, and the FWHM is usually required to be as short as possible.

It is known to produce ultra-short UV laser radiation pulses by frequency multiplication of ultra-short pulses generated by neodymium-glass or neodymium-YAG lasers and having a wavelength from 1.064 to 1.053 $\mu$m.

For some years a group of particularly high-power lasers (excimer lasers) have also been available emitting in the ultraviolet spectral range, e.g. the XeF laser at 353 nm, the XeCl laser at 308 nm, the KrF laser at 248 nm, the ArF laser at 193 nm and the $F_2$ laser at 157 nm.

These lasers are usually stimulated (pumped) by an electric discharge or by electron impact excitation and operated as oscillators with resonators. They can produce pulses having a FWHM of a few nanoseconds up to about 200 ns. However, these lasers can also be used as simple travelling wave amplifiers without a resonator. If an excimer laser amplifier is supplied with ultra-short light pulses having a wavelength within the amplification range of the excimer laser used, and if the operating conditions are suitable, ultra-short pulses of very high intensity are obtained at the output.

It is an object of the invention to provide a simple process of generating individual pulses having a widely variable duration irrespective of the length of the pump pulse.

The invention relates to a method of producing individual short laser pulses, in which a stimulatable laser medium common to two resonators is excited by a pump pulse in order to produce a population inversion above a laser threshold value, and the population inversion is kept below the threshold value after emission of a single short radiation pulse. It is characterised in that energy from the first resonator in the form of the desired individual short laser radiation pulse is first obtained from the stimulatable laser medium via a first relaxation process of preset threshold value, relatively short time constant and relatively low quality factor Q, after which, before the next short relaxation radiation pulse can build up, the inversion in the laser medium is kept below the preset threshold value of the first resonator by a second relaxation process of relatively long time constant and relatively high quality factor in the second resonator coupled to the first.

In the invention therefore, the two previously-mentioned alternative processes are combined in a non-obvious manner, by using relaxation pulses obtained by resonance of a short optical resonator and simultaneously suppressing all relaxation pulses following the first, using a second coupled resonator. This combination can unexpectedly be used to produce individual, very short laser radiation pulses.

The aforementioned method (in which a stimulatable laser medium is common to two resonators and energy in the form of the desired individual short laser radiation pulse is taken from the first resonator by means of a first relaxation process of preset threshold value, relatively short time constant and relatively low Q after which the inversion in the laser medium is kept below the preset threshold value of the first resonator by a second relaxation process of relatively high time constant and relatively high Q in the second resonator coupled to the first) and the disclosed devices are applicable to all lasers pumped by pulsed lasers. The method is surprisingly simple and the devices for working the method are particularly free from technical complexity.

The invention also provides a less expensive, simpler method of producing ultra-short laser radiation pulses, more particularly in the UV spectral region, than by using the previously-mentioned prior art. The input pulses required in known frequency multiplication methods have hitherto had to be produced in a very expensive, technically complicated method, generally using synchronously pumped, continuously operated dye lasers pumped by an actively phase-coupled argon-ion laser or krypton-ion laser. Out of the continuous train of ultra-short pulses emitted by the dye laser at intervals equal to the resonator circulation time of the dye laser (about 5 to 10 ns), an individual pulse had to be coupled out by an electro-optical pulse selector and amplified by a multi-stage chain of dye laser amplifiers pumped by suitably synchronized, pulsed frequency-doubled neodymium-YAG or neodymium-glass laser radiation. An intense ultra-short radiation pulse then appeared at the output of the dye laser amplifier chain and was converted in a frequency doubler (with a typical efficiency of 10 to 50%) to the desired ultra-violet wavelength for use as input pulse for the excimer laser amplifier.

Preferred embodiments of the invention will now be described with reference to the drawings, in which:

FIG. 1 is a graph, already referred to;

FIGS. 5, 6 and 7 are diagrams of preferred embodiments of the invention;

FIG. 8 is a somewhat simplified diagram of a preferred embodiment of a device according to the invention for producing ultra-short laser radiation pulses;

FIG. 9 is a more detailed representation of part of the device in FIG. 8;

FIG. 10 shows oscillograms of laser pulses, referred to in the description of the device according to FIGS. 8 and 9, and FIG. 11 is a diagram of a preferred excimer laser amplification device for generating ultra-short UV laser radiation pulses in combination with the device in FIG. 8.

Figure 2:
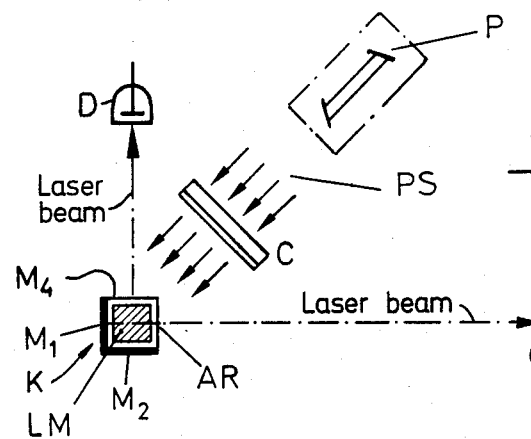
FIG. 2 is a diagram explaining the principle of the invention.
Figure 3:
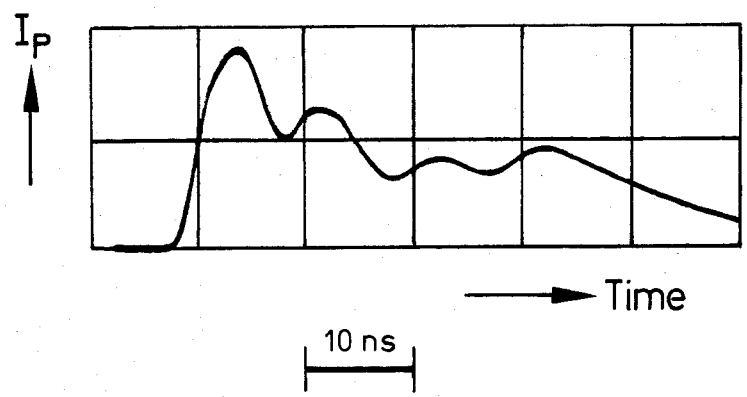
FIG. 3 is a graph showing the variation in time of a stimulating or pump radiation pulse.

The proposed device for producing short individual coherent radiation pulses is of such a general nature that it is basically of use in all kinds of lasers. For simplicity, however, we shall first discuss a particular example in the visible spectrum region, which is particularly easy to understand and particularly important for practical use. FIG. 2 is a diagram of a laser system comprising a dye cell K having a 1 mm square cross-section. Two adjacent surfaces of the cell have mirror coatings $M_1$ and $M_2$ whereas a third surface has an anti-reflecting coating AR. A mirror $M_3$ is disposed at a distance of a few centimeters parallel to the mirror surface $M_1$. The three mirrors $M_1$, $M_2$ and $M_3$ should have very high reflection coefficients in the visible spectrum region, i.e. should be made e.g. of thick silver layers or preferably of dielectric multiple layers which can withstand higher loads. A dye solution serving as a stimulatable active laser medium LM is sent through the cell in a direction perpendicular to the plane of the paper, the solution being e.g. a rhodamine-6G solution of suitable concentration, e.g. $10^{-3}$ mol/liter The solution is pumped by the radiation from a pump laser P, e.g. by focussing the pump laser beam PS by a cylindrical lens C in a focal line lying in the plane of the paper substantially along the diagonal extending from the points of intersection of the remote edges of mirrors $M_1$ and $M_2$ through the plane of the paper. The pump laser can e.g. be a xenon chloride excimer laser, whose output radiation pulses have the waveform shown in the oscillogram in FIG. 3.

The following account of operation will be only qualitative, but can be checked in quantitative detail by preparing the corresponding rate equations and solving them by digital computers. The active laser medium LM, i.e. the rhodamine-6G solution in the present case, is surrounded by two intersecting laser resonators. The first, long resonator is formed by the mirror surfaces $M_1$ and $M_3$ whereas the second resonator is formed by mirror $M_2$ and the opposite, uncoated glass-air interface $M_4$ of the cell. The latter has a Fresnel reflection coefficient of about 0.04 in the visible spectral region, if the cell walls are made of normal optical glass or quartz glass.

If the cell is irradiated with an intense, steeply rising pump pulse of suitable amplitude, even in the rising part of the pump pulse a laser oscillation is produced in the short resonator $M_2$, $M_4$; owing to its short length of only slightly more than 1 mm, it very quickly reaches the equilibrium state and thus forms a first, very short relaxation pulse which emerges as a laser beam from the Those skilled in the art will have no difficulty in devising various other embodiments of such coupled resonators, in which a first relaxation pulse is generated in a short resonator in the described manner and laser oscillation subsequently occurs in a longer, higher-quality resonator and suppresses all further relaxation oscillations in the short resonator. Some examples are shown in FIGS. 5, 6 and 7. In the embodiment in FIG. 5, the first resonator, in which the laser threshold is first reached, is formed by two walls $W_1$, $W_2$ of a cell K1 containing an active laser medium, e.g. a suitable dye solution. One wall $W_1$ has a dielectric multiple-layer coating constructed so as to have a very small reflectivity for the pump laser radiation PS but a very high reflectivity for the wavelength of the laser radiation LS. The other wall $W_2$ has a relatively low reflectivity, e.g. 10%, for the laser radiation wavelength and a correspondingly high transmissivity. Wall $W_2$ can be constructed so that it reflects nearly all the pump radiation in to the cell. The mirror coating is preferably placed on the inner surfaces of the cell walls, which are preferably made of glass or quartz.

The second, long resonator is defined by two reflectors $M_5$, $M_6$ which very efficiently reflect the laser radiation and are disposed so that the rays between them pass through wall $W_2$ and are reflected at wall $W_1$ as shown in FIG. 5.

The pump radiation enters the cell through wall $W_1$ and the laser radiation emerges in the opposite direction through wall $W_2$.

In the embodiment in FIG. 6, the cell K2 is of similar construction to the embodiment in FIG. 5, but the second, long resonator is a ring resonator and e.g. comprises four reflectors $M_7$ to $M_{10}$ having a very high reflectivity for the laser radiation. In the embodiment, reflectors are disposed so that the rays in the ring resonator travel axially through the cell, i.e. substantially parallel to walls $W_1$ and $W_2$.

In the laser systems in FIGS. 5 and 6, the pump radiation can also enter through one of the cell walls not shown in the drawings, i.e. through a wall extending parallel to the plane of the diagram. In that case there will be no restriction on the reflectivity R of wall $W_1$ relative to the pump laser wavelength.

In the embodiment in FIG. 7, the first, short resonator is defined by a first reflector $M_{11}$ and a second reflector $M_{12}$ disposed perpendicular to a chain-dotted first optical axis $O_1$ and at a preset first optical spacing along this axis. Reflector $M_{11}$ has a very high reflectivity for laser radiation, whereas the second reflector $M_{12}$ is made partially reflecting in known manner, so that the laser radiation can emerge.

The second, long resonator is defined by two reflectors $M_{13}$ and $M_{14}$, which must have a very high reflection factor for the laser radiation. Reflectors $M_{13}$ and $M_{14}$ are disposed perpendicular to a second optical axis $O_2$ and at a preset second optical spacing, which is considerably greater than the spacing between reflectors $M_{11}$ and $M_{12}$. The optical axes $O_1$ and $O_2$ cross one another, i.e. they extend as a whole substantially perpendicular to one another and intersect at a cell K3 containing the active laser medium. The cell walls through which the radiation travels are preferably disposed at the Brewster angle, at least with respect to the optical path $O_2$.

This embodiment has the special advantage that no wavelength-selective mirrors are required, and is therefore most widely preferred at present.

The individual short laser radiation pulses produced in the described manner are very useful for producing individual ultra-short radiation pulses by stimulating a distributed feedback dye laser oscillator as described in the above mentioned U.S. Pat. No. 4,479,220, incorporated by reference. In general, the pump intensity of the DFB laser must not be high enough for the emitted DFB laser radiation pulses to combine into a single relatively wide pulse, but must form a train of separate individual pulses. The output pulse from the DFB laser can then be converted by frequency multiplication into a desired input pulse having the right wavelength and the desired width for an excimer laser amplifier.

The production according to the invention of individual ultra-short laser radiation pulses will now be described by way of example with reference to the preferred device shown in FIG. 8. The parameters mentioned e.g. lens focal lengths, cell dimensions, laser media and the like, are examples only and can be suitably modified in other embodiments and applications. To avoid repetition, it should also be noted that all components such as beam splitters, lenses, prisms and cells transmitting UV radiation, more particularly excimer laser radiation, must be manufactured from a suitable material such as quartz glass.

To simplify the description it is also assumed that the excimer laser used is a modified commercial device, e.g. the model EMG 150 excimer laser produced by Lambda Physik of Goettingen, F. R. Germany, and filled with a suitable gas e.g. for producing xenon chloride laser radiation of wavelength 308 nm. Of course, the present process and the device described hereinafter are not restricted to this special laser. Other known eximer lasers can be used instead, provided they fulfil the conditions given hereinafter.

The aforementioned known commercial excimer laser comprising an oscillator part and an amplifier part is modified as follows for the purposes of the invention. The reflecting mirrors, which reflect the output beam from the oscillator part into the input of the amplifier part, and the resonator which in the commercial device surrounds the amplifier part to produce regenerative amplification, are removed so that the radiation from the oscillator, which has a pulse energy of about 100 mJ and a FWHM of 20 ns, is directly available.

In the device shown in FIG. 8, a beam 12 from a diagrammatically-indicated oscillator part 10 of the excimer laser and comprising a series of radiation pulses lasting about 20 ns at intervals of a few milliseconds to seconds, is reflected by a mirror 14, after which its energy is divided by partly physical and partly geometrical beam splitting in a beam splitter system 16 so that it irradiates various cells I to VIII described hereinafter and each containing a suitable laser medium, more particularly a dye solution, with a pulse energy having the right value for stimulating these laser media. To this end the beam-splitting system contains beam splitters S1 to S3, reflecting mirrors U2 to U5 and reflecting prisms P1 to P3.

Some of the pump energy radiation reflected by beam splitter S1 is branched off through prism P1. The remaining radiation 17 is focussed by a spherical lens 18, focal length 350 mm, and a cylindrical lens 20, focal length 150 mm, in a cell 1 (shown on a larger scale in FIG. 9 and denoted by 22) polished on all sides and having an inner cross-section of $5 \times 10$ mm², the focussing being such as to excite intense fluorescence in a dye solution contained in the cell, e.g. a $3 \times 10^{-3}$ molar cell and can be detected by a photodiode D or another suitable instrument (e.g. a streak camera) for measuring the variation of the pulse in time.

Figure 1:
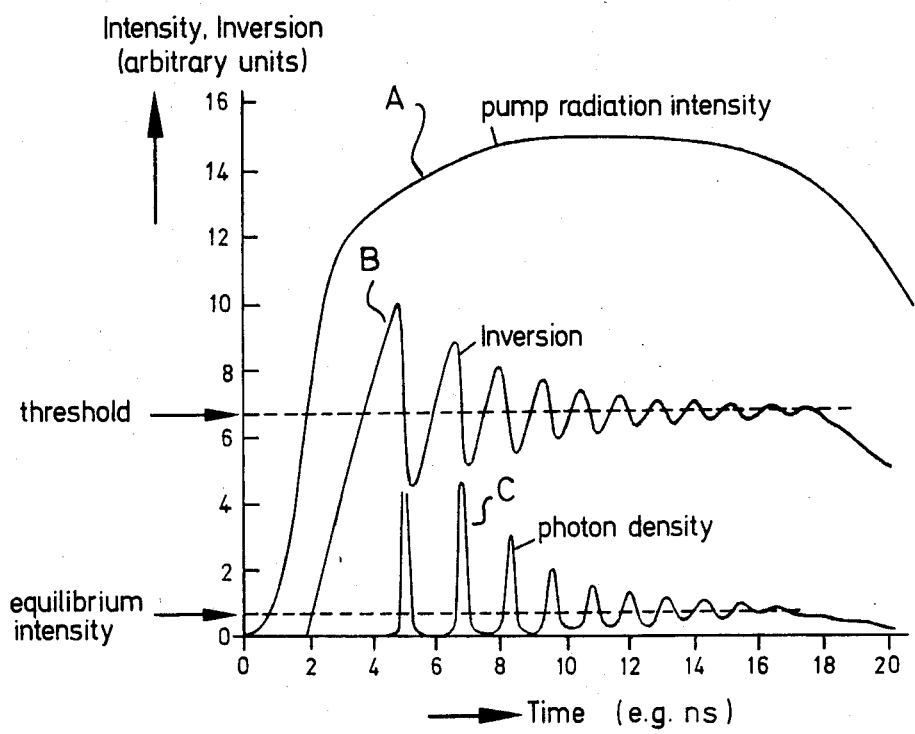

In the long resonator M1, M3, on the other hand, the laser threshold is reached much later, since the resonator is several centimeters long, i.e. several tens times the length of the short resonator. According to the invention, the length of the second resonator is chosen so that the first relaxation pulse in this resonator occurs exactly at the end of the first relaxation pulse from the short resonator and before the second relaxation pulse from the short resonator has begun. In other words, the relaxation pulse in the long resonator begins in the time between the end of the first relaxation pulse in the short resonator and the time when the next relaxation pulse in the short resonator would begin, i.e. in the time between about 5 and 6 ns in FIG. 1. The first relaxation pulse from the long resonator then reduces the inversion of the medium to below the critical inversion corresponding to the laser threshold of the short resonator. Thereafter the inversion will not rise appreciably above this value and will thus always remain considerably below the threshold of the short resonator, which is very high owing to the large coupling-out losses (96%) through the uncoated surface of the cell, in contrast to the long resonator which has very low losses through the highly reflecting mirrors $M_1$ and $M_2$. Consequently, during the entire remaining duration of the pump pulse, laser oscillation will occur in the long resonator but not in the short resonator, thus achieving the object of producing only a single short laser pulse irrespective of the length of the pump pulses, the laser pulse emerging from the uncoated wall M4 of the cell K.

Figure 4:
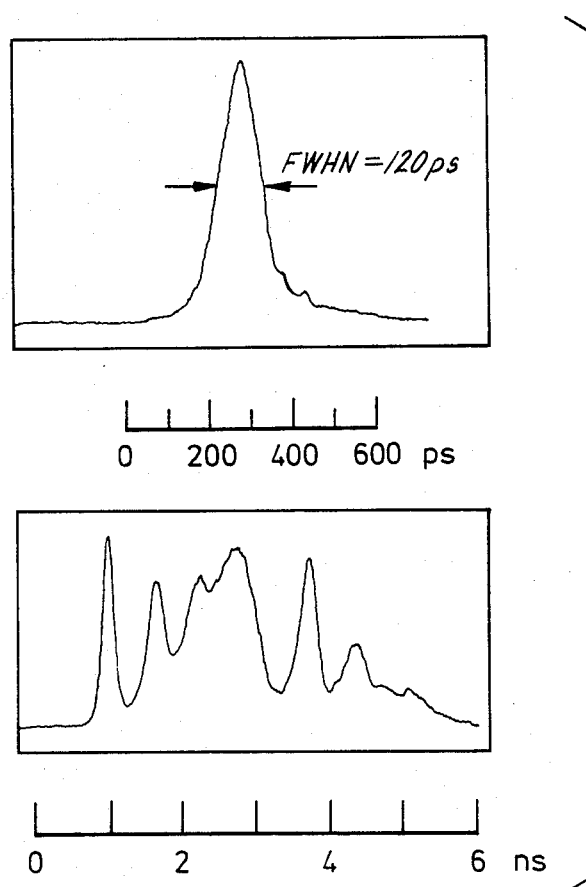
FIG. 4 is a graph of the variation in time of an output radiation pulse from a laser according to an embodiment of the invention.

FIG. 4 (top) shows the resulting pulse, as recorded by a streak camera. The obtained pulse FWHM is 120 ps. The bottom of FIG. 4 shows a relaxation pulse train from the short resonator, as produced if mirror $M_3$ is removed or a piece of paper is put between the cell and mirror $M_3$ to suppress the laser oscillation in the long resonator. This very clearly shows how the long resonator suppresses the second and all subsequent relaxation pulses in the short resonator. An examination of polarization of the laser beam from the short resonator showed that when the pump radiation was unpolarized the first relaxation pulse had completely linear polarization, the electric vector being parallel to the plane of the paper, whereas subsequent relaxation pulses were only partly polarized or made up of two overlappings pulses polarized at right angles to one another, thus explaining the irregular sequence of the subsequent relaxation pulses when mirror $M_3$ is removed or covered. This polarization of the first pulse can be explained by the right-angled position of the transition moments of the emitting and absorbing dipole in the chosen dye molecule. In other dye molecules, where the two dipoles are parallel, the polarization of the first pulse will be perpendicular thereto. The subsequent differently-polarized relaxation pulses obtained when mirror $M_3$ is covered can be accounted for by rotation of the excited dye molecule in the solution.

Closer analysis of the rate equations shows that at a higher pump pulse amplitude, as shown in the bottom half of FIG. 4, the laser power does not fall completely to zero between the first and second relaxation pulse. Even so, subsequent emission from the short resonator can be completely suppressed if the length of the second resonator is suitably adjusted.

In order to reduce the FWHM of the individual pulse generated in the short resonator, the life of the short resonator must be kept at a minimum. The life or time constant of a resonator depends mainly on its length, i.e. the circulation time of the laser radiation, and also on the reflecting capacity of the resonator mirrors, see W. Muller and H. Weber: Decay Time of Optical Resonators, Optics Communications, Vol. 23, No. 3, pp. 440–442 (December 1977). In the present case the resonator life can be defined as the time during wich the photon density in a passive resonator (i.e. a resonator in which no photons are actively generated in a laser medium) falls to 1/e. The fall is due to coupling-out of the laser radiation, e.g. by a partially transparent mirror, and other losses, e.g. diffraction losses, reabsorption in the active medium, absorption in the reflector layers, etc. All this can be combined into an effective reflectivity R in which case the resonator life $t_c$, in the case where R is not substantially different from unity (i.e. a high-quality resonator), is defined as follows:

$$t_c = L/(c(1-R))$$

where L is the optical path length in the resonator (one way only), c is the speed of light and R is the effective reflectivity (if both mirrors have high reflection factors $R_1$, $R_2$, then $R = \sqrt{R_1 R_2}$).

The life of the short resonator can be reduced to a minimum if the optical length of the resonator is kept small, i.e. a few millimeters in the present case (the active medium is 1 mm long and therefore the optical path in the short resonator is 1 mm multiplied by the refractive index in the solution plus the optical path length in the two cell walls, which are made e.g. of glass or quartz glass) and if the quality factor of the resonator is kept low by high coupling-out. A close analysis of the solution of the rate equations by computer also shows that it is particularly advantageous if the proportion of spontaneous emission entering the solid angle of the laser beam is kept as low as possible, since this proportion of the spontaneous emission triggers laser oscillation whereas if laser oscillation is initially triggered slowly, it is delayed until the pump power has become very high so as to generate a relaxation pulse having a steeper leading edge and a correspondingly steeper trailing edge so that the overall FWHM is very short. To this end, the transverse dimensions of the active medium can be made not greater than its longitudinal dimension as in the present case, or advantageously can be made smaller. For example the reflection at the uncoated surface M4 of the cell could be replaced by an external mirror which is small and is disposed at a certain distance from the cell parallel to the cell wall, which would then be provided with an anti-reflective coating. In that case the proportion of spontaneous emission which excites laser oscillation can be further reduced by spectral selection via a filter, prism or grating, in order further to shorten the first relaxation pulse. The rise speed of the pump light pulse always has a critical influence on the minimum attainable FWHM. The rise speed can be increased e.g. by increasing the gradient of the pump light pulse by first passing it through a saturable absorber which in known manner substantially suppresses the beginning of the pump light pulse, which is of low intensity, whereas the intense peak of the pulse is transmitted practically without attenuation.

solution 24 of p-terphenyl in cyclohexane in a region 5 mm long and about 2/10 mm thick directly behind the entry surface 26 and having a longitudinal axis extending exactly perpendicular to the two side surfaces 28, 30 of the cell. The thus-excited dye molecules form the active medium in a device according to the invention for producing individual short laser pulses as described hereinbefore with reference to FIGS. 1 to 7. In such a device, a common stimulatable medium is disposed inside two resonators, one being short and of low quality whereas the other is longer and of high quality, the spacings between the mirrors of each resonator being chosen so that the laser oscillation subsequently building up in the long resonator reaches an intensity, immediately after the first relaxation pulse emitted from the short resonator, such that it suppresses radiation in the short resonator by competing for the stored inversion of the active medium.

FIG. 9 shows another special embodiment of the device. The side walls 28, 30 of cell 22 form the short resonator. A highly-reflecting mirror M and a partly permeable mirror M* are disposed in the manner shown at certain distances, shown approximately to scale in FIG. 9, from the side walls 28, 30 of cell 22 and at the level of the focal line of the pump radiation. The long resonator is provided by the reflections at mirror M, the total reflection at the entry surface 26 of cell 22 and the partial reflection at side 30. For illustration, two beams are shown, one continuous and the other chain-line. There is a similar optical path for the partly reflecting mirror M*, but even if mirror M* is completely omitted, the device still operates in the desired manner, since mirror M* produces only additional, stronger suppression of the subsequent relaxation pulses. The desired beam 32, which contains only the first short relaxation pulse, emerges in direction A whereas the radiation from the long resonator emerges in directions B and can be stopped by a simple disc diaphragm (not shown) concentric with beam A.

In FIG. 10 the operation of this device is shown in a streak camera photograph. The lower curve shows the short laser pulse in direction A whereas the top curve shows the emission from cell 22 when mirrors M and M* are removed.

Of course other equivalent devices according to the teaching of the parent patent could be used for producing the desired individual short radiation pulse.

The device in FIG. 9 delivers laser pulses about 300 ps long with an average wavelength of 340 nm. These pulses (beam 32) are now used in a device as per the general teaching of U.S. Pat. No. 4,479,220 to generate a still shorter individual pulse with a wavelength of 616 nm in a DFB laser, which can then be converted by frequency doubling in a crystal 34 to produce an input pulse of the right wavelength and the desired width for the amplifier part of the excimer laser.

Preferably, however, before being supplied to the DFB laser the pulse generated by the device in FIG. 9 has its spectral range reduced and its power increased. To this end, as shown in FIG. 8 beam 32 has its spectral range reduced by an aperture stop 36 in combination with a collecting lens 38 and an optical grating 40 in near autocollimation, and is then brought to the necessary power in two amplifier stages 42 and 44. Of course, this spectral narrowing can be brought about by any other process known to the man skilled in the art, e.g. by prisms, interference filters or other selection means. The first amplifier stage 42 contains a spectrophotometer cell 46 (cell II) polished on all sides as before and having an inner cross-section of $20 \times 20$ mm$^2$ and filled as before with a $3 \times 10^{-3}$ molar solution of p-terphenyl in cyclohexane. The pump energy for amplifier stage 42 is supplied via beam splitter S1, prism P1 and reflecting mirror U2 and focussed by a cylindrical lens 48 (f=156 mm) directly behind the entry window of cell 46. Note that the optical axis of the excited space must not be perpendicular to the side cell walls, to avoid stimulating any undesired laser oscillation. To avoid such oscillation, the cell can be tilted about 10° to the right or left.

The beam emerging from the first amplifier stage 42 is expanded by a factor of 3 by a beam-expanding Galilean telescope comprising a negative lens 50 (f= −55 mm), 100 mm away from a positive lens 52 (f=150 mm) and then enters cell III. Cell III has a cross-section of $40 \times 20$ mm$^2$ and is filled with a solution of p-terphenyl in cyclohexane at a concentration of $1.5 \times 10^{-3}$ m/l, to increase the depth of penetration of the exciting radiation. The exciting radiation is focussed via a beam splitter S2 and cylindrical lens 54 (f=156 mm) into the cell. Focussing should not be sharp; slight defocussing is advantageous, to increase the height of the stimulated space so that the entering beam with its widened cross-section travels only through stimulated (pumped) space and is correspondingly amplified. As before, this cell should of course be tilted to prevent feedback. The emerging beam now has a diameter of about 1 mm and is focussed by a cylindrical lens 56 (f=80 mm) through a quartz block 58 and via an optical grating (diffraction grating) 60 behind the entry surface of a cell K of a DFB laser system. This embodiment of a DFB laser is a modification of the DFB laser known from the aforementioned U.S. Pat. No. 4,479,220 and is particularly advantageous if the generated laser pulses do not have to be adjusted over a wide spectral range, since it requires practically no adjusting work. Further details are described in the publication by Zs. Bor, B. Racz, G. Szabo and A. Mueller in Picosecond Phenomena III, Eds., K. B. Eisenthal, R. M. Hochstrasser, W. Kaiser, A. Laubereau, Springer Verlag, Berlin 1982. The cell K, about 7 mm long, is filled with a $5 \times 10^3$ molar solution of rhodamine B in a solvent mixture containing 85.1 vol.% benzyl alcohol and 14.9 vol.% methanol. This solvent has a refractive index such that at room temperature emission occurs at 616 nm if the optical grating 60 has 2442 lines/mm as in the present case. The laser radiation at the desired wavelength 616 nm emerging from cell K is then sent via a reflecting mirror 62, a spherical lens 64 (f=50 mm) reducing the divergence to the desired value, and a Fresnel's rhomb 66 to produce circularly polarized light which in the subsequent amplifier stages ensures that the stored inversion is more efficiently used for amplification than would be posible with linearly polarized light, which can use only about half the stored inversion if the excited molecules have an isotropic direction distribution.

One special feature of the method chosen here of operating the DFB laser is that the irradiated stimulating pump energy is considerably higher than necessary for producing a single pulse. In practice a number of pulses following one another at intervals of about 100 ps are first produced and then suppressed into two successive amplifier stages 68 and 70 operating as per the invention explained with reference to FIGS. 1 to 7. The advantage is that in this method of operation the FWHM of the first pulse in the DFB laser pulse train is considerably lower, owing to the increased pump energy, than with operation with individual pulses.

The first stage 68 for amplifying the DFB laser beam contains cell V, which has a cross-section of 10×10 mm² and is filled with a 1.4×10⁻³ molar solution of sulphorhodamine B in ethanol. The pump energy radiation is supplied via beam splitter S3, reflecting mirror U3 and prism P2, the prism being positioned so that it branches off an approx. 4 mm wide part of the pump beam reflected by mirror U3. The excitation radiation branched off by prism P2 is as before focussed by a cylindrical lens 72 into cell V. A thin quartz glass plate 74, e.g. a quartz microscope cover glass or slide, is disposed behind cell V at 7 mm from the exit point of the amplified beam and perpendicular thereto. Plate 74 reflects about 10% of the intensity of the emerging amplified beam into the cell, where it is further amplified but in the reverse direction. Owing to the relatively low pump energy and the small amplification path, this soon results in complete saturation of amplification, i.e. completely brings an end to the stored inversion. Owing to the short distance between plate 74 and cell V, the reflected beam reaches the entry end of the stimulated portion of dye solution even before the second pulse has arrived from the DFV laser. When the second pulse travels through the dye solution it encounters practically no inversion and consequently no possibility of amplification and is thus suppressed. To increase the amplitude of the amplified first pulse relatively to that of the suppressed second pulse, the process is repeated in a similarly-constructed second amplifier stage 70 containing cell V1 and a quartz glass plate 78. This stage receives somewhat higher pump energy via a reflecting prism P3 extending somewhat further into the beam reflected by mirror U3, and has a longer amplification length of 7 mm. As before a cylindrical lens 80 is provided and like lens 82 has a focal length f=110 mm.

The amplifier stages 68, 70 and the quartz glass plates disposed near the cells are a modification of the method of suppressing undesired additional pulses explained with reference to FIGS. 1–7, enabling the first DFB laser pulse to be reliably selected.

Advantageously, before the pulses are amplified in two additional last stages 82 and 84, the undesired spontaneous fluorescence generated in the various amplifier stages is suppressed. This amplified spontaneous fluorescence (ASE=amplified spontaneous emission) is a serious problem in the use of short pulses, at least in linear optics, since the pulses in spite of their low intensity have a long duration (corresponding here e.g. to the 20 ns excitation radiation pulses) and therefore may have an energy content as high as that of the ultra-short radiation pulse which is alone of interest, so that energy detectors may give an excessively high value instead of measuring the energy of the ultra-short pulse. The problems of ASE and methods of suppressing ASE are known. Probably the best-known method, which is also preferably used here, is the method of saturable absorption. To this end, in the device according to FIG. 8 the amplified beam leaving cell VI of amplifier stage 70 is focussed by a short focal-length collecting lens (f=50 mm) into a 2 mm thick cell disposed at an angle to the optical path to avoid feedback and filled with a 10⁻⁴ molar ethanolic solution of an absorber dye such as 1,1-diethyl-2,2'-carbocyanine iodide. At the given layer thickness, this solution has a small-signal transmission of less than 10⁻³ for low-intensity ASE, whereas transmission for an intense ultra-short laser pulse is more than 30%. The pulse shape is also steeper, since the feet of the ultra-short laser pulses are more strongly attenuated than the main part of the pulse since the transmission of the absorber solution is dependent on intensity.

The beam emerging from the absorber cell 88 is conveyed weakly divergent by a collecting lens 90 (f=50 mm) into cell VII of amplifier stage 82, which is filled with a 5×10⁻⁴ molar solution of sulphorhodamine B in ethanol and has an amplification length of 40 mm and a width of 20 mm. Most of the component beam coupled out by beam splitter S3 is supplied as excitation energy via mirror U4 and a cylindrical lens 92 to amplifier stage 82. As before, a larger inverted volume is obtained by slight defocussing and increasing the depth of penetration into the less concentrated solution, so as to receive the somewhat larger-diameter beam. As is known, the beam diameter has to be progressively increased from stage to stage, since a well-dimensioned amplifier chain which does not substantially broaden the shape of a pulse to be amplified must be designed so that the saturation energy at the exit window of each stage exceeds $E_{sat}=h\nu/\sigma$, where h is Planck's constant, $\nu$ is the freqency of the laser beam and $\sigma$ is the emission cross-section of a dye molecule at the laser wavelength. The emerging amplified beam is conveyed through a second absorber stage 94 comprising an entry lens 96 (f=40 mm) an obliquely positioned absorber cell 98 and an exit lens 100 (f=100 mm), producing a Kepler's telescope expanding the beam by a factor of 2.5 and having an absorber cell 98 at its intermediate focus. Thereafter the beam travels through another Fresnel's rhomb 102 to reconvert circular polarization into linear polarization, and then passes through a polarization prism 104 which is adjusted to maximum transmission of the pulse and greatly suppresses the residual intensity in the undesired direction of polarization The beam then enters a final amplifier stage comprising cell VIII which is preferably a prismatic cell as per Bethune (Applied Optics Vol. 20 pp. 1897–1899, 1981). It has an amplifying path length of 35 mm and a bore diameter of 2 mm and is pumped via mirror U5 by half the energy of the excitation radiation 12. A cylindrical lens 106 (f=220 mm) is used for vertically reducing the beam diameter and matching it to the small diameter of the bore of cell VIII. The amplified pulse leaving cell VIII is conveyed by mirrors U6 and U7 to a frequency doubling crystal 34 (potassium dihydrogen phosphate, 30 mm long) and there frequency-doubled to the wavelength 308 nm. The non-converted radiation of 616 nm is absorbed in a downstream filter plate 108 (e.g. Schott Glasfilter VG11) and the radiation at 308 nm leaving the filter is widened by a telescope 110 to a diameter of 14 mm and finally conveyed via a mirror U8 as the input signal 112 entering the excimer laser amplifier stage shown in FIG. 11.

As FIG. 11 shows, beam 112 is sent obliquely via a reflecting prism 114 through an Excimer laser discharge chamber 116 bounded by electrodes E, so as just to avoid touching the two electrodes E. After being reflected by a second prism 118 and a mirror 120, the beam is widened by a Galilean telescope comprising lenses L1 and L2 and reflected by an additional mirror 122 in the optical path between the lenses so that during a second transit it completely illuminates the cross-section of the discharge chamber 116 of the Excimer laser amplifier part. Since part of the inversion of the xenon chloride molecules stored in the discharge chamber has already been depleted during the first transit of the beam, the radiation pulse must be delayed by the previously-described detour before the beam re-enters during the second transit, so that the inversion has been completely restored by vibration-rotation relaxation of the excited xenon chloride molecules and by the still-continuing discharge pumping with electrodes E. This means that the detour must correspond to a transmit time of about 1 to 2.5 ns, to obtain maximum output power. The resulting beam 124 emerging from discharge chamber E contains pulses having an energy of at least 10 mJ and a duration of less than 5 ps, i.e. individual pulses having a peak power of at least 2 Gigawatts.

In the aforementioned commercial excimer laser the oscillator part and the amplifier part are simultaneously pumped by a common thyratron with discharge current pulses about 20 ns long. If the pump beam paths are suitably chosen in FIG. 8, the DFB laser emission can be applied at a time such that the second transit of the radiation pulse through the Excimer laser amplifier part is reached at exactly the time of maximum inversion during the discharge in chamber 116, in order to maximize the output power in beam 124. More particularly the pump pulse for the dye laser chain in FIG. 8 is coupled out during the initial part of the front flank of the discharge current pulse, and the distances travelled by the pump beams in FIG. 8 are chosen so that maximum inversion occurs in chamber 116 during the second transit of radiation 112.

Figure 8:
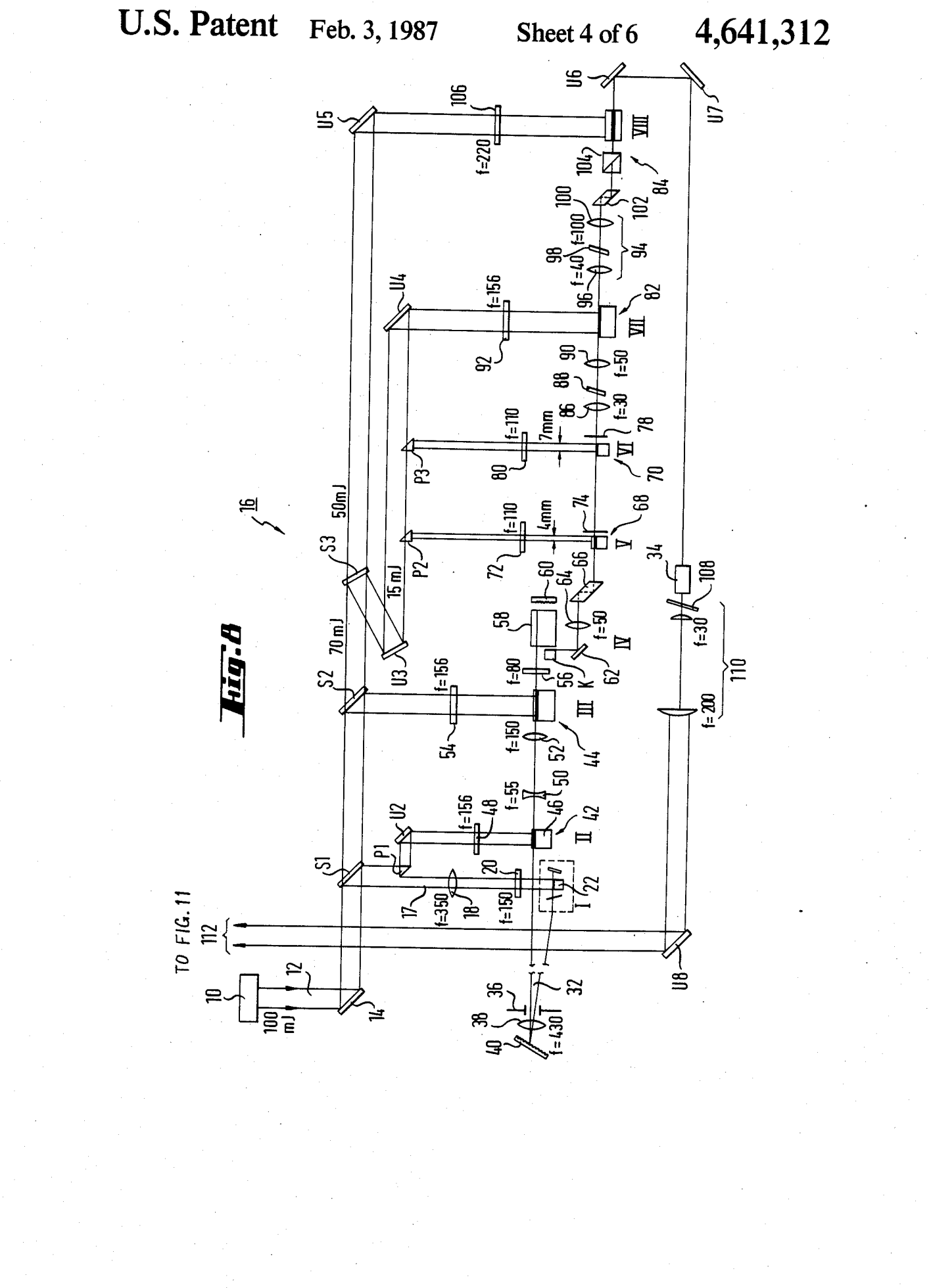

In the device in FIG. 8 the dye solutions can usually be stationary in simple spectrophotometer cells, but this reduces the pulse repetition frequency to about 1 Hz. If, on the other hand, flow-through cells are used in all cases, the dye solutions in the pumped area being replaced between each two successive laser shots, thermal striation can be avoided and the repetition frequency is then limited by the excimer laser used, e.g. to 25 Hz in the present example. In principle, however, excimer lasers can give pulse repetition frequencies in the kilohertz range, which can be used according to the invention. These high repetition frequencies and consequently high medium powers are an important advantage of the invention compared with the previous use of frequency-multiplied neodymium glass or neodymium-YAG lasers.

If a flow-through cell is likewise used in the DFB laser and it or the solution flowing through it are kept at a constant temperature, the DFB laser wavelength can be so finely adjusted via the temperature and consequently the refractive index of the solution, that the excimer laser beam wavelength can be tuned over the entire spectral range, several nanometers wide, of the excimer fluorescence bands.

In addition to the excimer wavelengths in the above-described example, other wavelengths up to about 230 nm can be obtained in a very simple manner, obvious to those skilled in the art, by using the appropriate dyes in the DFB laser and the amplifier chain and selecting a grating having the right number of lines per millimeter in the DFB laser, following the instructions in the previously-mentioned U.S. Pat. No. 4,479,220, and by selecting and accurately adjusting a suitable frequency-doubling crystal. At shorter wavelengths, no suitable frequency-doubling crystals are usually available. In such cases (e.g. for operation at the wavelength of the argon fluoride laser, 193 mm), frequency doubling is advantageously replaced by displacement to the desired shorter wavelength by the stimulated anti-Stokes-Raman effect in a gas cell filled e.g. with hydrogen at a few atmospheres. This method has since then been repeatedly described for frequency shifting of dye laser emission to shorter wavelengths (see e.g. N. Morita, L. H. Lin and T. Yajima: Appl. Phys. B Vol. 31, pp. 63–67, 1983). After the desired anti-Stokes line has been selected by a spectral selection means, e.g. a prism, the spectrally shited pulse can be used as an input pulse for the excimer laser amplifier.

Various other embodiments can be used instead of the excimer laser in the form of an oscillator amplifier combination used in the example. For example a small excimer laser can be used as the input 10 for producing radiation 12 (FIG. 8) for pumping the dye laser and a large high-power excimer laser can be used for amplifying the ultra-short ultra-violet pulses forming beam 112 and both lasers can be carefully synchronized which can be done with commercial electronic means with an accuracy of about a nanosecond, which is completely sufficient. In addition, in applications where the UV pulses need not be particularly powerful, two separate small excimer lasers can be synchronized in the described manner or only a single excimer laser can be used, its resonator surrounding only part of the discharge-pumped inverting space of the excimer laser whereas the rest of the space is used for amplification. Finally, to obtain specially powerful pulses, a number of excimer lasers can be connected in sequence to amplify the UV input pulse to the required energy or power in a number of stages.

In the example described in detail with reference to FIGS. 8 to 11, the device can be used to obtain a pulse duration (FWHM) below 5 ps, but the duration can be further reduced by suitable choice of the first dye laser according to the invention and the DFB laser as per the previously mentioned U.S. Pat. No. 4,479,220. Finally the femto-second range can be reached by using a method for shortening the dye laser emission at the appropriate place in the dye laser amplifier chain or at its output, as described briefly by B. Nikolaus and D. Grischkowsky (Appl. Phys. Lett. Vol. 42 pp., 1–2, 1983). This method was used to shorten a dye laser pulse having a FWHM of 5.4 ps by a factor of 12 to450 fs. If the process is used twice in succession, a pulse FWHM of 90 fs can be reached. After frequency doubling or Raman shifting, these pulses can be used as input pulses for the excimer laser amplifier to produce corresponding ultra-short excimer laser pulses, if pulse widening by undesired dispersion or transit-time effects is carefully avoided or compensated in known manner.

The given cell dimensions relate to the cross-section at right angles to the laser radiation.

As a rule the radiation pulse 112 in the excimer laser amplifier part is amplified in power by a factor of at least $10^3$.

What is claimed is:

1. In a method of producing an individual laser radiation pulse of predetermined short duration utilizing a single stimulatable laser medium common to a first resonator and a second resonator, said first resonator having a low quality factor, a short time constant, and a high laser threshold value, said second resonator having a high quality factor relative to said low quality factor, a long time constant relative to said short time constant and a low laser threshold value relative to said high laser threshold value, the laser medium being excited by a pump pulse having a duration much longer than said short pulse duration and an amplitude sufficient to produce a population inversion in the laser medium exceeding said high laser threshold value, and in which the population inversion is reduced below said high threshold value after emission of a short duration radiation pulse, the improvement comprising the following steps:

A. generating said short duration laser pulse by a relaxation process in the first resonator, said relaxation process tending to produce a series of spaced short duration laser radiation pulses, of which the individual short duration laser pulse is the first; and B. after production of said individual short duration laser pulse and before any subsequent relaxation pulse in said series can build up in said first resonator, maintaining the population inversion in said laser medium below said high threshold value in said first resonator by a steady build-up of laser oscillations in said second resonator, said oscillations in said second resonator continuously withdrawing sufficient energy from said laser medium to keep the population inversion therein below said high threshold value in said first resonator until termination of said pump pulse.

2. A method according to claim 1, in which the short duration laser radiation pulse is further utilized to produce an ultrashort laser radiation pulse, comprising the additional step of:

C. applying the short duration pulse as a pump pulse to a distributed feed-back (DFB) laser oscillator, the intensity of the DFB laser pump pulse relative to the threshold of the DFB laser medium being such that the DFB laser medium emits at least one ultrashort radiation pulse.

3. A method according to claim 1, in which the intensity of the DFB laser pump pulse relative to the DFB laser threshold is chosen so that the DFB laser medium emits a sequence of a number of separate ultrashort radiation pulses, and comprising the additional step of:

D. selecting the first ultrashort pulse in the sequence by a laser amplifier containing a reflector system which keeps the population inversion in the DFB laser medium below the DFB laser threshold value after amplifying the first pulse in the sequence.

4. A method according to claim 2, comprising the following additional steps:

E. amplifying and frequency multiplying the output of the DFB laser oscillator;

F. and supplying such a frequency-multiplied output as an input to an excimer laser amplifier for amplification.

5. A system for producing an individual laser radiation pulse of predetermined short duration comprising:
a stimulatable laser medium;
a first optical resonator, including said laser medium, and having a low quality factor, a short time constant, and a high laser threshold value;
a second optical resonator, including said laser medium, and having a high quality factor relative to said low quality factor, a long time constant relative to said short time constant, and a low laser threshold value relative to said high laser threshold value; and
pump pulse source means for applying a pump pulse to said laser medium, said pump pulse having a duration substantially greater than said short pulse duration and an amplitude sufficient to produce a population inversion in said laser medium exceeding said high threshold value so as to initiate a relaxation process in said first resonator, said relaxation process tending to produce a series of spaced short duration laser radiation pulses of which the individual short duration laser pulse is the first;
said optical resonators and said pump pulse source having characteristics such that said low emission threshold value in said second transistor is reached after said first relaxation pulse has appeared and ceased in said first resonator and before the high threshold value for a subsequent pulse in said series has been reached in said first resonator, a steady buildup of laser oscillations in said second resonator continuously withdrawing sufficient energy from said laser medium to keep the population inversion therein below said high threshold value until the end of said pump pulse.

6. A system according to claim 5, in which:
said first resonator comprises two opposed parallel walls of a rectangular cell containing the laser medium, one wall comprising a highly-reflecting mirror and the other wall being only partly reflective; and
the second resonator comprises a third wall of said cell having a highly-reflecting mirror and perpendicular to the walls of the first resonator and a second highly-reflective mirror disposed at a distance from the side of the cell opposite the third wall.

7. A system according to claim 6 in which the fourth wall of the cell has an anti-reflective coating.

8. A system according to claim 5 in which:
the first resonator comprises two opposed parallel walls of a cell containing the laser medium, one wall having a high reflection factor for the laser medium wavelength and a low reflection factor for the pump pulse radiation wavelength and the second wall having a relatively low reflection factor and a relatively high transmission factor for the laser wavelength; and
the second resonator is defined by two highly reflecting mirrors disposed adjacent the cell and positioned so that the mirrors intercept radiation passing through the second wall of the cell and reflected by the first cell wall.

9. A system according to claim 5, in which:
the first resonator comprises two opposed parallel walls of a cell containing the laser medium and the second resonator comprises a plurality of highly reflecting mirrors forming an annular resonator for radiation which travels through the cell between the aforesaid two cell walls.

10. A system according to claim 9 in which the laser medium is disposed in a cell whose walls are aligned at the Brewster angle at least to the second optical axis.

11. A system according to claim 5 in which:
the first resonator comprises two reflectors disposed transversely to a first optical axis and at a given first spacing along that axis, the first reflector having a very high reflectivity for the laser radition whereas the second reflector partly reflects but mainly transmits the laser radiation;
the second resonator comprises two additional reflectors disposed transversely to a second optical axis intersecting the first, said additional reflectors being positioned at a given second spacing along said second axis which is substantially greater than the first spacing; and
the laser medium is disposed at the point of intersection of the two optical axes.

12. A system according to claim 5 in which the second resonator is at least five times as long as the first resonator.

13. A system according to claim 5, in which the laser medium is a dye solution.

14. A system according to claim 5, and further comprising a laser amplifier to which the individual short laser radiation pulses are supplied at an intensity such that the laser amplifier amplifies only one out of a number of input radiation pulses following each other at short intervals.

15. A system according to claim 5, in which the system further comprises a distributed feedback (DFB) dye laser oscillator to which the aforesaid first radiation pulse emitted by the first resonator is applied as a pump pulse.

16. A system according to claim 15, and further comprising:
at least one additional laser amplifier disposed to amplify the output of the DFB laser, which additional laser amplifier comprises means for maintaining the population inversion in its laser medium below its laser threshold value after amplification of the first short radiation pulse supplied thereto.

17. A system according to claim 15, and further comprising:
an excimer laser comprising an oscillator part, an amplifier part including a chain of dye solution laser medium cells, and a switching element, common to the oscillator part and amplifier part, for switching energy generating a population inversion in the oscillator part and amplifier part, the oscillator part serving as a pump radiation source for all required dye solutions employed as laser media in the system and the amplifier part serving to amplify the pulse output generated by the laser cell chain.

18. A method of producing an individual short duration laser radiation pulse comprising the following steps:
providing a laser medium and first and second optical resonators each including said laser medium, said first resonator having a relatively low quality factor, a relatively short time constant, and a relatively high laser threshold value, said second resonator having a relatively high quality factor relative to said low quality factor, a relatively long time constant relative to said short time constant and a relatively low laser threshold value relative to said high laser threshold value;
exciting said laser medium by a pump pulse having a duration much longer than said short pulse duration and an amplitude sufficient to produce a population inversion density in said laser medium exceeding said relatively high laser threshold value for said first resonator;
generating said individual short duration laser radiation pulse by a relaxation process in said first resonator, which process tends to produce a series of spaced short duration pulses, of which said individual pulse is the first; and
preventing the generation of subsequent short duration laser pulses in said series by decreasing the inversion density in said laser medium below said high threshold value, after termination of said individual pulse, through withdrawal of energy from said laser medium in the form of laser oscillations which gradually build up in said second resonator and continue until termination of said pump pulse.

19. An apparatus for producing an individual short duration laser radiation pulse comprising:
a laser medium;
first and second optical resonators each including said laser medium, said first resonator having a relatively low quality factor, a relatively short time constant, and a relatively high laser threshold value, said second resonator having a relatively high quality factor, a relatively long time constant relative to said short time constant and a relatively low laser threshold value relative to said high laser threshold value; and
excitation means for exciting said laser medium by applying a pump pulse having a duration much longer than said short pulse duration thereto to produce a population inversion density in said laser medium exceeding said relatively high laser threshold value for said first resonator;
said first resonator generating said individual short duration laser pulse by a relaxation process in said first resonator, which process tends to produce a series of spaced short duration pulses, of which said individual pulse is the first,
said second resonator preventing the generation of subsequent short duration laser pulses by decreasing the inversion density in said laser medium below said high threshold value through withdrawal of energy from said laser medium in the form of laser oscillations which gradually build up in said second resonator and continue until the end of said pump pulse.

* * * * *